(No Model.)

E. W. FREIBURGHOUSE.
HARROW.

No. 542,470.  2 Sheets—Sheet 1.

Patented July 9, 1895.

Witnesses
E. C. Duffy
Hubert Peak

Inventor
E. W. Freiburghouse
by O. E. Duff
Attorney (No Model.) 2 Sheets—Sheet 2.
E. W. FREIBURGHOUSE.
HARROW.
No. 542,470. Patented July 9, 1895.
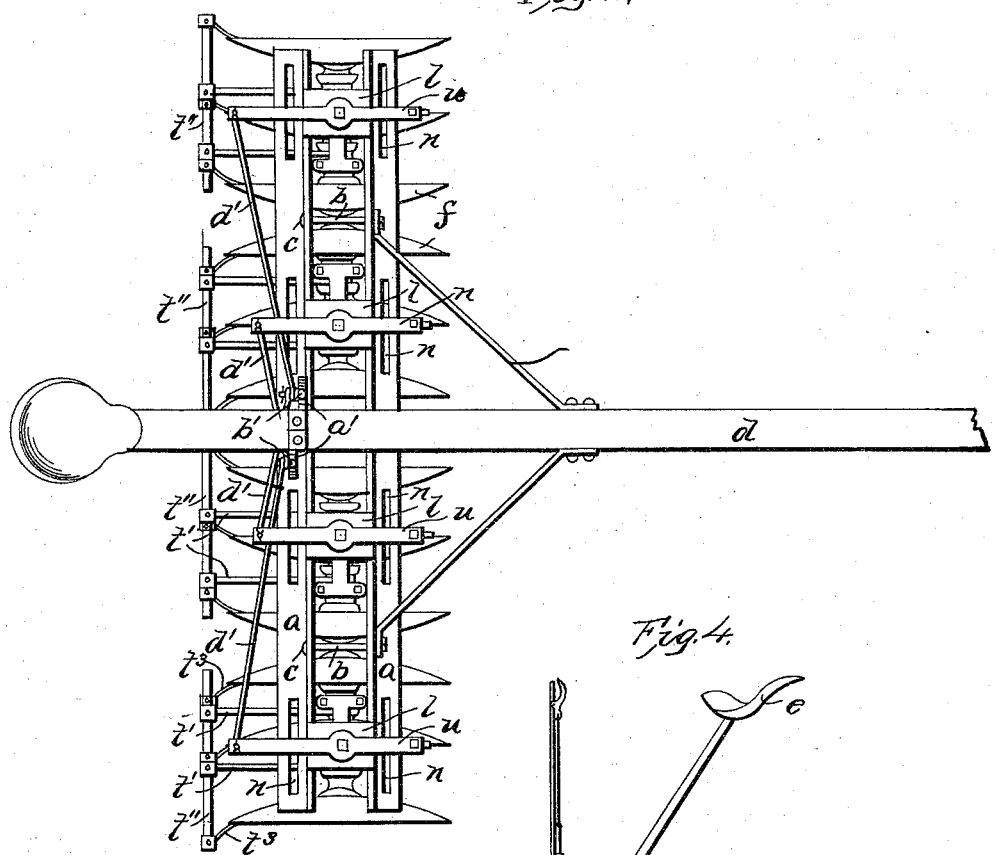
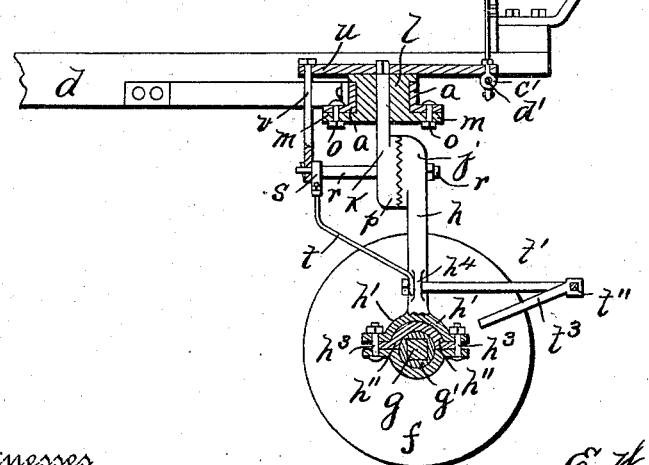
Witnesses
E. C. Duffy
Chas. M. Werle
Inventor
E. W. Freiburghouse
by O. E. Duffy
Attorney

UNITED STATES PATENT OFFICE.

EDWARD W. FREIBURGHOUSE, OF HIAWATHA, ASSIGNOR OF ONE-HALF TO EPHRAIM KEIM, OF SABETHA, KANSAS.

HARROW.

SPECIFICATION forming part of Letters Patent No. 542,470, dated July 9, 1895.

Application filed September 13, 1894. Serial No. 522,906. (No model.)

*To all whom it may concern:*

Be it known that I, EDWARD W. FREIBURGHOUSE, of Hiawatha, in the county of Brown and State of Kansas, have invented certain new and useful Improvements in Harrows; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to certain improvements in harrows.

The object of the invention is to provide an improved disk harrow or cultivator exceedingly simple, durable, and economical in construction and composed of a minimum number of parts to accomplish the functions desired, and which can be easily and quickly adjusted to the various positions desired.

The invention consists in certain novel features of construction and in combinations of parts more fully and particularly pointed out and described hereinafter.

Figure 1:
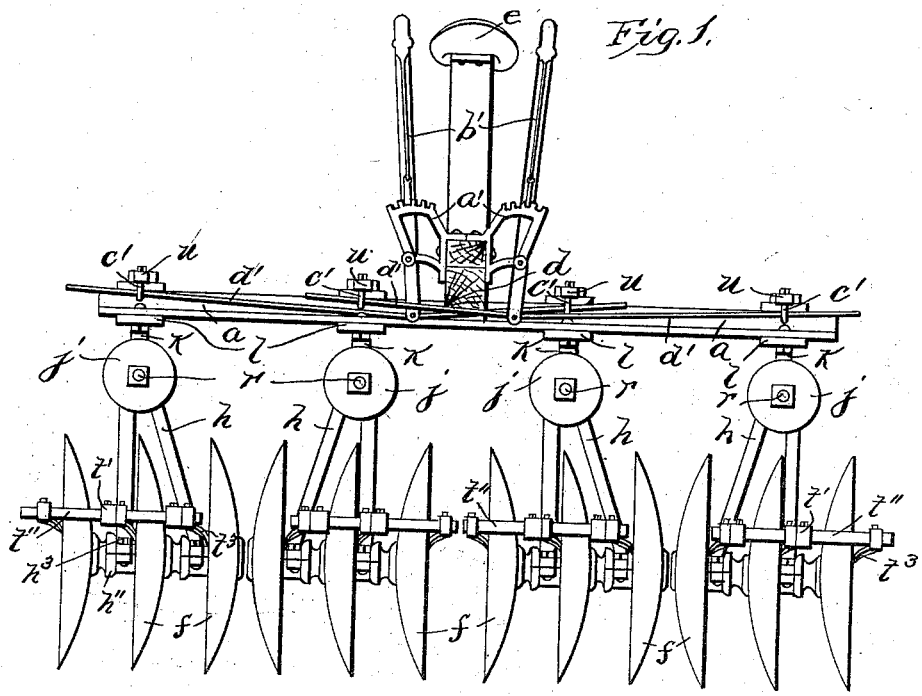
Figures 3, 5:
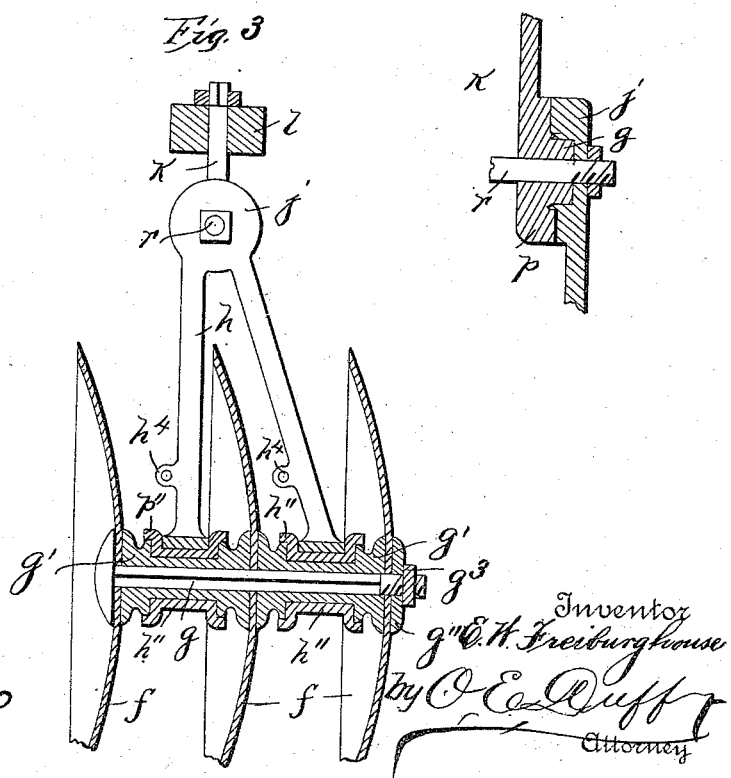

Referring to the accompanying drawings, Figure 1 is a rear elevation of the improved disk harrow. Fig. 2 is a top plan thereof. Fig. 3 is a longitudinal section through one gang of disks. Fig. 4 is a vertical cross-section. Fig. 5 is a detail section through the toothed disks holding a gang of disks.

In the drawings, $a\ a$ are two parallel transverse beams constituting the frame of the harrow and rigidly held a suitable distance apart by the sleeves $b$ on the bolts $c$, passing transversely through the beams. Each beam is preferably formed of an angle-iron with the vertical edge or side at the inner side of the beam.

$d$ is the tongue preferably extending across and secured to both beams and having the brace-rods extending therefrom and secured to the frame by said bolts $c$.

$e$ is the driver's seat secured on the rear portion of the tongue.

$f$ are the harrow-disks of any suitable or ordinary construction.

The disks are here shown arranged in gangs, three disks to each gang. However, I do not wish to limit myself to such specific arrangement. The disks of each gang are mounted on a suitable horizontal shaft $g$. Each gang of disks is provided with an upwardly-extending frame $h$, preferably inverted-V shaped, having the disk-shaft mounted in its lower ends. The lower ends of each frame $h$ are flanged (see $h'$) to fit the separable boxings $h''$, secured together and to said flanges by the bolts $h^3$.

The squared shaft $g$ passes through the two sleeves $g'$, which rotate with the shaft and in the boxes $h''$. The center disk is clamped between the inner heads of the two sleeves $g'$. One end disk is clamped between the outer head of one sleeve and a head on the shaft $g$, while the outer end disk is clamped between the outer head of the other sleeve and a washer $g''$. This end of the shaft $g$ is threaded and all the disks and sleeves are clamped thereto and in position by the nut $g^3$. This is a most durable and effective mode of securing the disks to the shafts and confining them to the hangers.

The upper end of the frame above the disks is provided with the vertical toothed disk $j$, having the central depression around a horizontal bolt-hole. Each frame $h$ is attached to a rotatable hanger $k$, having a shank at its upper end journaled in and passing up through a slot $l$, arranged snugly between the beams of the frame with flanges $m$ extending under said beams. The horizontal portions of the beams are provided with elongated slots $n$, for each block, which determine the range of lateral adjustment of the gangs of disks. The flanges $m$ of each block have clamping-bolts $o$ passing up through said slots so as to clamp the block and the gang in the desired lateral adjustment. The lower end of each hanger has the vertical toothed disk $p$ meshing with the teeth of the frame-disk, and with a central circular boss $q$ fitting in the said central depression of the frame-disk.

$r$ is a horizontal clamping-bolt passed through said two toothed disks of each gang, whereby they are clamped together to hold the gang in the desired vertical adjustment. Each clamping-bolt $r$ is extended forwardly a suitable distance. A stirrup $s$ surrounds the outer front portion of said bolt, and braces $t\ t$ are secured thereto and extended downwardly and secured to the lower ends of the frame $h$. The upper end of each rotatable hanger has a cross-head $u$ secured rigidly thereon so as to rest on the block $l$ and extend forwardly and rearwardly beyond the beams of the frame. These braces $t\ t$ are preferably secured to the braces by being clamped to the ends of rearwardly-extending rods $t'\ t'$, having their front ends passed through and secured in eyes $h^4$ in the lower portions of frams $h$. The rear ends of the two rods $t'\ t'$ of each gang of disks adjustably carry the horizontal bars $t''$, which have the cleaners $t^3$ secuted thereto. The cleaners can be moved toward and from the disks by moving the bars $t''$ longitudinally through the rear ends of the arms $t'$.

The front end of each cross-head is secured to the outer end of the horizontal clamping-bolt of its particular gang by the vertical rod or bolt $v$. A most strong and rigid construction is thus formed to cause the gang to turn with its cross-head and to brace and strengthen the gang against rearward strain when the harrow is in operation.

$a'\ a'$ are two metal brackets secured to the rear end of the tongue and extending laterally in opposite directions. Each bracket is provided with a rack.

$b'\ b'$ are the two levers for adjusting the gangs horizontally. Each lever is mounted on one of said brackets to swing in a plane parallel with the length of the frame, and is provided with a hand-clip and pawl to hold the lever in any position desired in connection with the bracket-rack. The two levers are thus arranged on opposite sides of the rear end of the tongue at the rear side of the machine. The rear end of each cross-head has an eye-bolt $c'$ loosely mounted therein. The connections $d'$, loosely secured to the levers, extend through the eye-bolts $c'$ of their respective gangs, and are adjustably clamped therein by set-screws. The outer end gangs are connected with the levers on their respective sides of the machine, while the inner gangs are connected respectively with the levers on the opposite sides of the machine. Thus it will be observed that the gangs on the same side of the machine are rocked horizontally in opposite directions, which is very desirable when cultivating crops in rows where it is desired to throw the soil to or from the plants.

It will be observed that the gangs can be adjusted laterally toward or from each other by reason of the slidable blocks and the slots in the frame; also, that each gang can be rocked vertically and held in the desired position by reason of the sectional frames comprising the toothed disks and bolts. When the bolt is loosened the disks can be turned on each other and then clamped in the desired position, whereby the dirt on either or both sides of ridges can be worked as in listed corn; also, by means of the levers and adjustable connections to the gangs, the gangs can be turned to any desired angle to the line of draft.

It is evident that various changes might be made in the forms, constructions, and arrangements of the parts described without departing from the spirit and scope of my invention. Hence, I do not wish to limit myself to the particular construction herein set forth.

Having thus fully described my invention, what I claim as new, and desire to secure by Letters Patent of the United States, is—

1. In a disk harrrw, the combination of a supporting frame, a hanger therefrom having the toothed disk, the disks mounted on a shaft, the vertical frame in which said shaft is journaled provided with the vertical toothed disk, the clamping bolt passing through said disks and extended beyond the same, a stirrup on said bolt, and braces from said stirrup to the lower portions of said vertical frame.

2. In a harrow, the combination of a harrow frame, the depending turnable disk frames, each provided with a gang of disks, rigid cross heads on the upper ends of said frames, levers connected therewith to turn the frames, each frame having a joint, and a clamping bolt extending outwardly beneath the cross head, vertical rods rigidly connecting the cross heads and said bolts, and braces from the bolts to the lower portions of the frames, substantially as described.

3. The combination of the frame, the adjustable blocks therein, each block having a depending frame in which a harrow disk shaft is mounted, each frame being turnable in its block and formed to permit lateral swing, the rigid cross heads on the upper ends of said depending frames, the horizontal bolts extending forwardly from said depending frames, and at their outer ends rigidly connected by the vertical rods with the front ends of their respective cross heads, the levers at the rear side of the machine being connected with the opposite ends of the cross heads.

4. The combination in a harrow, of the main frame composed of the two bars, the tongue extending across the bars, the series of turnable harrow disk gangs adjustably arranged in the frame, the two brackets mounted on the tongue, the two levers mounted on said brackets to swing transversely to the line of draft, a rod adjustably connecting the left hand lever and the intermediate right hand gang and the outer left hand gang, and a rod adjustably connecting the right hand lever and intermediate left hand gang and outer right hand gang, substantially as described.

5. In a harrow, the combination of a main frame, the depending turnable disk gang frame jointed and having the clamping bolt, a horizontal bolt extending through the lower part of the frame and projecting rearwardly, a brace between said two bolts, a horizontal bar secured to the rear end of said horizontal bolt, and the cleaners secured thereto, substantially as described.

In testimony that I claim the foregoing as my own I affix my signature in presence of two witnesses.

EDWARD W. FREIBURGHOUSE.

Witnesses:
W. A. TURNER,
JAMES HATCH.